United States Patent Office 3,111,853
Patented Nov. 26, 1963

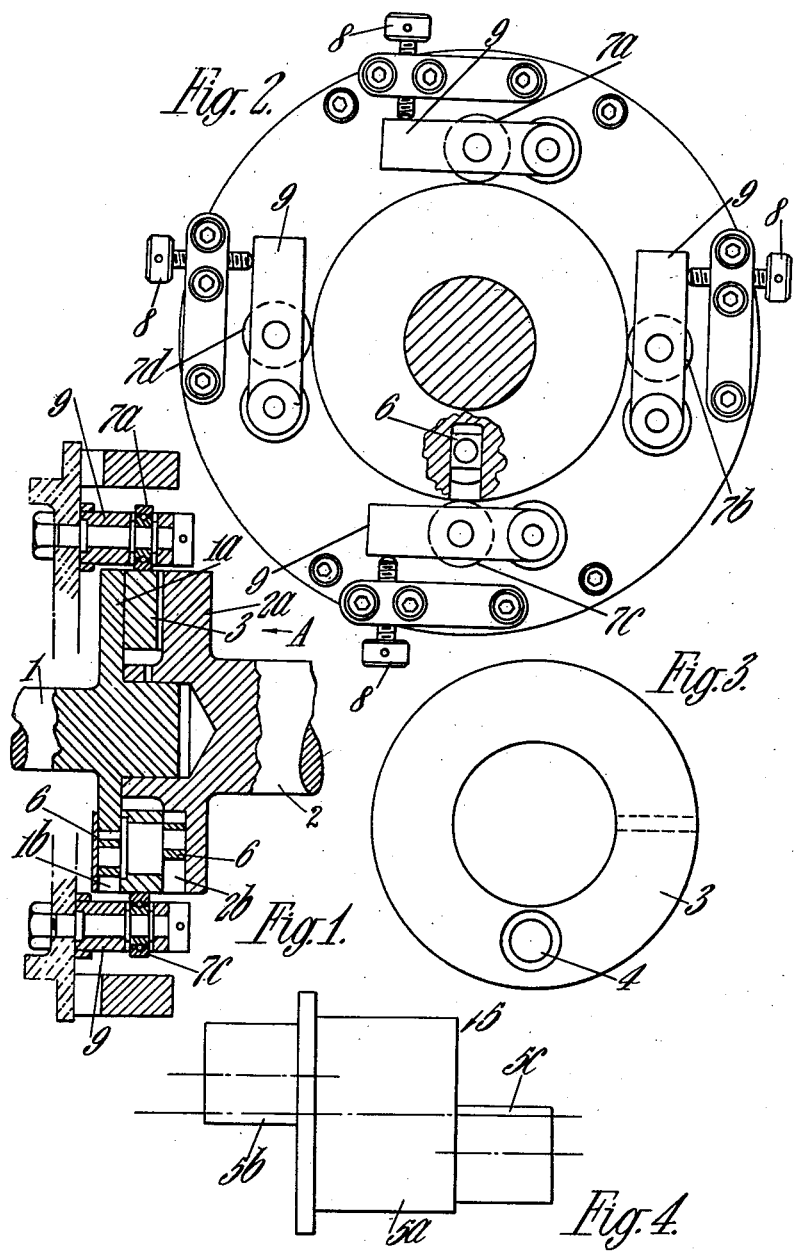

3,111,853
MEANS FOR CORRECTING OR IMPARTING CYCLIC VARIATIONS IN ANGULAR POSITION OF OR TO A ROTATING SHAFT OR THE LIKE
Douglas Edward Wallis, Newcastle-upon-Tyne, England, assignor to Sir Howard Grubb Parsons & Company Limited, Newcastle-upon-Tyne, England
Filed Oct. 2, 1961, Ser. No. 142,050
Claims priority, application Great Britain Oct. 3, 1960
3 Claims. (Cl. 74—69)

This invention relates to means for correcting errors in the instantaneous angular positions of a driven shaft or the like due to inaccuracies, for example, in driving means therefor or in bearings associated therewith, and alternatively to means for producing cyclic variations in angular velocity during each revolution of a driven shaft or the like.

The cyclic errors referred to above are usually caused by inaccuracies in the manufacture of a component of the driving means rotating a driven shaft, for example, inaccuracy in gearing or bearings thereof. In worm and worm-wheel drives, for example, the accuracy of the worm will be dependent on the accuracy of the lead screw of the machine on which it is produced and errors in the form of the worm can mean that the angular velocity of the worm wheel departs from the intended value during each revolution of the worm. Such errors at instantaneous angular positions are found to approximate to a sine curve over one revolution of the worm, that is to say if the difference between the theoretical and actual instantaneous angular positions of the worm-wheel were to be plotted against the time for one revolution of the worm it would be found that the resulting curve approximates to a sine curve.

Clearly the more accurately the worm can be made the less will be the cyclic variations in the speed of the worm-wheel during each revolution of the worm and although it is possible to reach very high standards of accuracy in the manufacture of such worms, the cost is high because of the very great care that must be taken, especially in the finishing of the profile of the worm. Similar care can also be taken in the manufacture of the bearings and the drive for the worm as these components can also produce cyclic variations.

In some instances highly accurate methods of manufacture are essential by the nature of the use of the equipment, but in other instances it may be desirable from a cost point of view to adopt means for correcting the effects of the small manufacturing errors rather than use costly manufacturing techniques.

It is accordingly an object of the present invention to provide means for correcting the effects of errors due to inaccuracies in the driving means for a driven shaft or the like or in bearings associated therewith that substantially meet the latter requirement.

According to the present invention there are provided means for correcting errors in the instantaneous angular positions of a driven shaft or the like due to inaccuracies, for example, in driving means therefor, or for producing cyclic variations in angular velocity during each revolution of a driven shaft or the like, which means comprise a coupling between a driving shaft and a driven shaft, the axes of which are aligned, which coupling comprises three adjacent members, namely a flange on the driving shaft, a flange on the driven shaft and a member intermediate the two flanges the axis of rotation of which member is parallel to the common axis of the driving and driven shafts but is displaceable with respect thereto, a drive being transmitted from the flange on the driving shaft to the intermediate member through a pin and slot arrangement and from the intermediate member to the flange on the driven shaft through a further pin and slot arrangement, the pins lying in a common radial plane which contains the common axis of rotation of the driving and driven shafts and the axis of rotation of the intermediate member, said pins being disposed at different radial distances from the axis of rotation of said intermediate member and both being disposed on the same side of said axis of rotation.

One mode of carrying the present invention into effect will now be described, by way of example, with reference to the accompanying diagrammatic drawings in which:

FIGURE 1 shows a longitudinal section through one form of coupling according to the present invention;

FIGURE 2 shows an end view of FIGURE 1 looking in the direction of the arrow A;

FIGURE 3 shows an end view of an intermediate member; and

FIGURE 4 shows the construction of a pin member on an enlarged scale.

Referring firstly to FIGURES 1 and 2, as shown a driving shaft 1 is coupled to a driven shaft 2 from which drive is transmitted, e.g. by a worm and worm wheel to a driven member. The shaft 1 drives the shaft 2 by way of a coupling comprising three adjacent members, namely, a member 1a in the form of a flange on shaft 1, a member 2a which is in the form of a flange on shaft 2 and a member 3 intermediate the flanges 1a and 2a.

The member 3 consists of an annular plate as can best be seen from FIGURE 3 and contains a circular hole 4, into which is inserted a pin member 5 shown in FIGURE 4.

The member 5 comprises a cylindrical portion 5a which fits into the hole 4 and is dimensioned so that when in the hole it does not rotate therein. In the form shown the member 5 has two protruding cylindrical pins 5b, 5c, the centres of which are displaced on either side of the centre line of the portion 5a and lie in the same radial plane. Both the protruding pins are of circular section. Fitting over each pin 5b, 5c is a bush 6 the outer periphery of which is square shaped as can be seen in FIGURE 2.

The flange 1a on the shaft 1 and the flange 2a each contain a radial slot 1b, 2b respectively in which the pins 5b, 5c and their associated bushes 6 slide during operation.

The member 3 is supported by four rollers 7a, 7b, 7c and 7d, the positions of which may be adjusted so as to displace the axis of the member 3 from the aligned axes of the shafts 1 and 2, to make the member 3 eccentric with respect to the said aligned axes of the shafts. The adjustment is made by screws 8 acting on lever arms 9 in which the rollers 7 are located.

Since in this example the shaft 2 has a worm or gear attached thereto which meshes with a driven member in the form of a gear wheel or worm wheel, minor errors in the formation of the gear wheel or worm wheel result in the drive transmitted to the said member being not uniform over a revolution of the shaft 2.

In many instances the deviation from uniform speed of the driven member during one revolution of the shaft follows approximately a sine curve, the driven member accelerating and decelerating at different times during each revolution. The device described herein, can, however, by adjustment of the eccentricity of the member 3, cause the shaft 2 to rotate in such a fashion that it compensates for errors in instantaneous positions of the driven member. The criterion is that the fluctuations in speed produced during one revolution of the shaft 2 should be in phase but of opposite sense to those produced in the driven member.

Whilst such errors have been described as being due to errors in a worm the invention can also be employed to correct cyclic variations produced by errors in other parts of the driving arrangement.

In general terms, therefore, the device is used to produce cyclic variations in angular position which can be arranged to correct or tend to correct other inherent errors of angular position in the driving means where such errors are cyclic and have a period equivalent to one revolution of the rotating members of the device.

By virtue of the fact that the member 3 is eccentrically mounted with respect to the axis of rotation of the shaft 2, the pin 5c slides in the slot 2b so that as the shaft 2 rotates it produces changes in angular position of the shaft relative to the driving shaft which compensates for the inherent error in angular position of the worm wheel during each revolution thereof.

Whilst in the form shown the pins are located in the member 3 and the slots in the flanges 1a and 2a, the pins could be on the flanges and the slots in the member 3 or the member 3 could carry one pin and one slot, the pin engaging a slot on one flange and the slot engaging a pin on the other flange.

A further feature of this arrangement, using two pins at different radii, is that it facilitates the adjustment of the device to give the desired correction or to produce the desired cyclic variations. The presence of one pin and slot produces a first cyclic variation which approximates to a sine law whilst the other pin and slot produces a similar cyclic variation in phase with the first but of opposite sign and the difference in the radii of the two pins produces a difference in amplitude between the two cyclic variations. The resultant cyclic variation applied to the driven shaft is thus the difference between the two. This enables correction of very small amplitudes to be made.

A mechanism embodying this invention has the advantage of simplicity of construction and can be fitted to a machine either initially or at some later stage. It can be adjusted to cover several different forms of cyclic variation and it is particularly useful in instances where it is possible to measure the cyclic variation only after the machine or device has been installed on site. By fitting a device embodying the present invention any variation arising on site after leaving the manufacturer's works can be corrected without the necessity of sending parts back to the works for correction.

Whilst its use has been described in connection with the correction of inherent errors in angular position it can be used to produce small cyclic variations in each revolution of a member should they be desired.

It will be further appreciated that the foregoing details are given by way of example only and that any desired modifications within the scope of the appended claims may be made to the invention in order to suit varying requirements.

I claim:

1. Means for correcting errors in instantaneous angular position of a driven shaft due to inaccuracies, for example, in the driving means therefor, or for producing cyclic variations in angular velocity during each revolution of a driven shaft; which means comprise a coupling between a driving shaft and a driven shaft the axes of which are aligned, which coupling comprises three adjacent members, namely a flange on the driving shaft, a flange on the driven shaft and a member intermediate the two flanges, the axis of rotation of which member is parallel to the common axis of the driving and driven shafts but is displaceable with respect thereto, a drive being transmitted from the flange on the driving shaft to the intermediate member through a pin and slot arrangement and from the intermediate member to the flange on the driven shaft through a further pin and slot arrangement, the pins lying in a common radial plane which contains the common axis of rotation of the driving and driven shafts and the axis of rotation of the intermediate member, said pins being disposed at different radial distances from the axis of rotation of said intermediate member and both being disposed on the same side of said axis of rotation.

2. Means as claimed in claim 1 in which the intermediate member is supported on rollers which are individually adjustable in the radial direction and disposed around its periphery, the displacement of the axis of rotation of said member being effected by adjusting the radial position of at least some of said rollers.

3. Means for correcting errors in instantaneous angular position of a driven shaft due to inaccuracies, for example in the driving means therefor or for producing cyclic variations in angular velocity during each revolution of a driven shaft; which means comprise a coupling between a driving shaft and a driven shaft the axes of which are aligned, which coupling comprises three adjacent members, namely a flange on the driving shaft, a flange on the driven shaft and a member intermediate the two flanges the axis of rotation of which member is parallel to the common axis of the driving and driven shafts but is displaceable with respect thereto, the intermediate member having two pins one on each opposite face thereof, one engaging a slot in the flange on the driving shaft and the other engaging a slot in the flange on the driven shaft, the two pins lying in a common radial plane which contains the common axis of rotation of the slots and the axis of rotation of the intermediate member, said pins being disposed at different radial distances from the axis of rotation of said intermediate member and both being on the same side of said axis of rotation.

References Cited in the file of this patent
UNITED STATES PATENTS

| | | |
|---|---|---|
| 379,971 | Miller | Mar. 27, 1888 |
| 771,261 | Monin | Oct. 4, 1904 |
| 2,286,694 | Talbot | June 16, 1942 |